US009015569B2

(12) United States Patent
Luo et al.

(10) Patent No.: US 9,015,569 B2
(45) Date of Patent: Apr. 21, 2015

(54) SYSTEM AND METHOD FOR RESOURCE-ADAPTIVE, REAL-TIME NEW EVENT DETECTION

(75) Inventors: Gang Luo, Yorktown Heights, NY (US); Chunqiang Tang, Ossining, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2244 days.

(21) Appl. No.: 11/513,988

(22) Filed: Aug. 31, 2006

(65) Prior Publication Data

US 2008/0059466 A1 Mar. 6, 2008

(51) Int. Cl.
*G06F 17/00* (2006.01)
*G06F 17/30* (2006.01)

(52) U.S. Cl.
CPC .... *G06F 17/30684* (2013.01); *G06F 17/30516* (2013.01)

(58) Field of Classification Search
USPC .......................... 715/713, 234, 255, 259, 200
See application file for complete search history.

(56) References Cited

U.S. PATENT DOCUMENTS

| | | | | | |
|---|---|---|---|---|---|
| 5,191,525 | A | * | 3/1993 | LeBrun et al. | 715/229 |
| 5,727,220 | A | * | 3/1998 | Hohensee et al. | 715/234 |
| 5,774,888 | A | * | 6/1998 | Light | 1/1 |
| 5,978,842 | A | * | 11/1999 | Noble et al. | 709/218 |
| 5,999,939 | A | * | 12/1999 | de Hilster et al. | 1/1 |
| 6,219,818 | B1 | * | 4/2001 | Freivald et al. | 714/799 |
| 6,954,766 | B2 | * | 10/2005 | Ouchi | 707/203 |
| 7,131,112 | B1 | * | 10/2006 | Bartz et al. | 717/122 |
| 7,287,223 | B2 | * | 10/2007 | Smoliar et al. | 715/704 |
| 2002/0091818 | A1 | * | 7/2002 | Cascio et al. | 709/224 |
| 2003/0164856 | A1 | * | 9/2003 | Prager et al. | 345/764 |
| 2003/0167443 | A1 | * | 9/2003 | Meunier et al. | 715/511 |
| 2003/0182321 | A1 | * | 9/2003 | Ouchi | 707/201 |
| 2005/0021324 | A1 | * | 1/2005 | Brants et al. | 704/9 |
| 2005/0097436 | A1 | * | 5/2005 | Kawatani | 715/500 |
| 2008/0228695 | A1 | * | 9/2008 | Sifry et al. | 707/2 |

OTHER PUBLICATIONS

Brants Thorsten et al., A System for New Event Detection, 2003, ACM, pp. 330-337.*
Kumaran Giridhar et al., Classification Models for New Event Detection, 2002, ACM, pp. 1-7.*
Luo Gang et al., Resource-Adaptive Real-Time New Event Detection, 2007, ACM, pp. 497-508.*
Braun et al., "Exploiting Topic Pragmatics for New Event Detection in TDT-2004", Topic Detection and Tracking 2004 Workshop, Dec. 2-3, 2004, available at http://www.nist.gov/speech/tests/tdt/tdt2004/papers/SHAI-TDT2004Paper.htm; 8 pages.

(Continued)

*Primary Examiner* — Manglesh M Patel
(74) *Attorney, Agent, or Firm* — Tutunjian & Bitetto, P.C.; Jeff Tang

(57) ABSTRACT

There are provided a system and method for resource adaptive, real-time new event detection. The method includes capturing, from among documents in a document streaming environment, first-story documents that mention previously unmentioned events. The method further includes dynamically adjusting a thoroughness of the capturing step by controlling a number of keywords and documents considered according to a real-time system load.

20 Claims, 17 Drawing Sheets

(56) References Cited

OTHER PUBLICATIONS

Page et al., "The PageRank Citation Ranking: Bringing Order to the Web", Technical report, Stanford Digital Library Technologies Project, Jan. 29, 1998, 17 pages.

Allan et al., "On-Line New Event Detection and Tracking", Annual International ACM SIGIR Conference on Research and Development in Information Retrieval, Aug. 24-28, 1998, Melbourne, Australia, pp. 37-45.

A. Singhal, "Modern Information Retrieval: A Brief Overview", IEEE Data Engineering Bulletin 24(4): pp. 35-43; Dec. 2001.

* cited by examiner

SYSTEM AND METHOD FOR RESOURCE-ADAPTIVE, REAL-TIME NEW EVENT DETECTION

This invention was made with Government support under Contract No.: H98230-05-3-0001 awarded by the U.S. Department of Defense. The Government has certain rights in this invention.

BACKGROUND

1. Technical Field

The present invention relates generally to data stream applications and, more particularly, to a system and method for resource-adaptive, real-time new event detection.

2. Description of the Related Art

In a document streaming environment, documents may come from one or more sources. New event detection (NED) is the task of capturing the first documents that mention previously unseen events. This task has practical applications in several domains, where useful information is buried in a large amount of data that grows rapidly with time. Such domains include, but are not limited to, intelligence gathering, financial market analyses, news analyses, and so forth. Applications in those domains are often time-critical and the use of an online new event detection (ONED) system is highly desired.

Turning to FIG. 1, events in a document stream are indicated generally by the reference numeral 100. In FIG. 1, different shapes correspond to different events, and filled shapes represent the documents that need to be captured.

Recently, ONED has attracted much attention. In order to provide a standard benchmark for comparing different algorithms, the National Institute of Standards and Technology (NIST) has organized a Topic Detection and Tracking (TDT) program, where ONED is one of the main tasks. Despite all the efforts, there is still a significant gap between the state-of-the-art ONED systems and a system that can be used in practice.

Most of the existing ONED systems compare a new document D to all the old documents that arrived in the past. If the similarity values between D and the old documents are all below a certain threshold, D is predicted to mention a new event. This method has quadratic time complexity with respect to the number of documents and is rather inefficient. For example, in the latest TDT5 competition, many systems spent several days on processing just 280,000 news articles, whose total size is less than 600 MB. This processing speed is orders of magnitude slower than a typical document arrival rate.

In practice, an ONED system can monitor a large number of document sources. For example, Google news has 4,500 sources and Yahoo! news has more than 5,000 sources. In other applications such as intelligence gathering, document sources can cover an even wider spectrum including, e.g., emails, instant messages, web bulletin boards, blogs, and so forth. Therefore, a practical ONED system needs to handle a high document arrival rate without resorting to an excessive amount of hardware resources. Moreover, due to the bursty nature of document streams, an ONED system should be able to operate gracefully even if it runs out of resources. These performance issues, however, have not been addressed in previous studies.

Turning to FIG. 2, a conventional online new event detection system (ONED) is indicated generally by the reference numeral 200. An output of the ONED system 200 is provided to an output queue 210, waiting to be consumed by a consumer 220. The consumer 220 can be, for example, a person or a computer program that does further deep analysis (e.g., machine translation). The processing speed of the consumer can be much slower than the peak output rate of the ONED system. For example, the state-of-the-art machine translation speed is measured by the number of words per second.

None of the existing ONED systems has considered the following user interface issues: (1) when the consumer is overloaded and cannot keep pace with the output rate of the ONED system, less important documents need to be dropped from the queue (or moved to a low-priority queue) so that the consumer can focus on important documents; and (2) depending on the concrete requirement of the consumer, documents can be sorted in the queue according to different criteria (e.g., importance or arrival time) so that desired documents are processed by the consumer first.

SUMMARY

These and other drawbacks and disadvantages of the prior art are addressed by the present principles, which are directed to a system and method for resource-adaptive, real-time new event detection.

According to an aspect of the present principles, there is provided a method for resource adaptive, real-time new event detection in a new event detection system. The method includes capturing, from among documents in a document streaming environment, first-story documents that mention previously unmentioned events. The method further includes dynamically adjusting a thoroughness of the capturing step by controlling a number of keywords and documents considered according to a real-time system load.

According to another aspect of the present principles, there is provided a computer program product including a computer usable medium having computer usable program code for resource adaptive, real-time new event detection in a new event detection system. The computer program product includes computer usable program code for capturing, from among documents in a document streaming environment, first-story documents that mention previously unmentioned events. The computer program product further includes computer usable program code for dynamically adjusting a thoroughness of the capturing step by controlling a number of keywords and documents considered according to a real-time system load.

According to yet another aspect of the present principles, there is provided a resource-adaptive, real-time new event detection system. The system includes a new event detector for capturing, from among documents in a document streaming environment, first-story documents that mention previously unmentioned events, wherein a thoroughness of the capturing is dynamically adjusted by controlling a number of keywords and documents considered according to a real-time system load.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
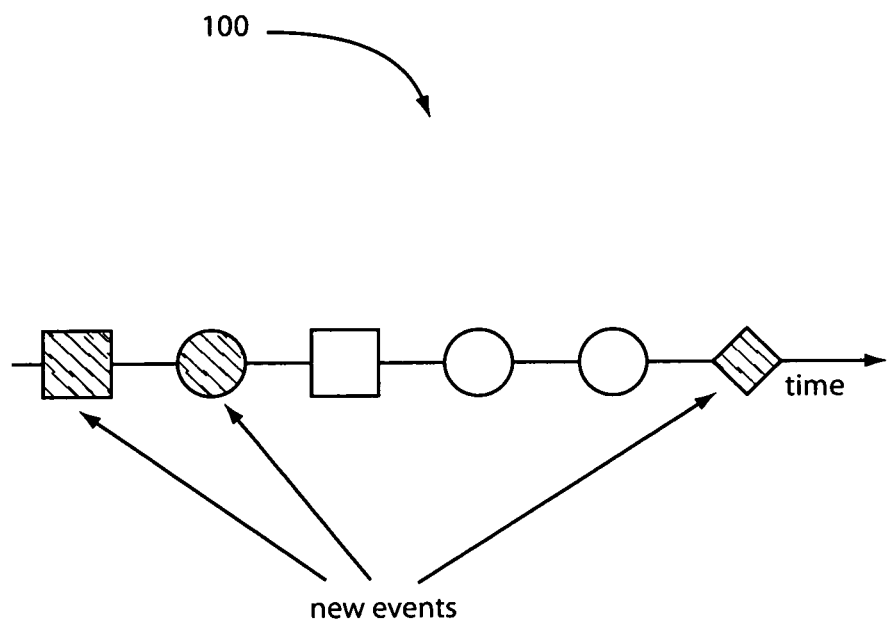
FIG. 1 is a diagram showing events in a document stream to which the present principles may be applied.

Embodiments of the present principles are directed to a system and method for resource-adaptive, real-time new event detection.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, and so forth.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 3:
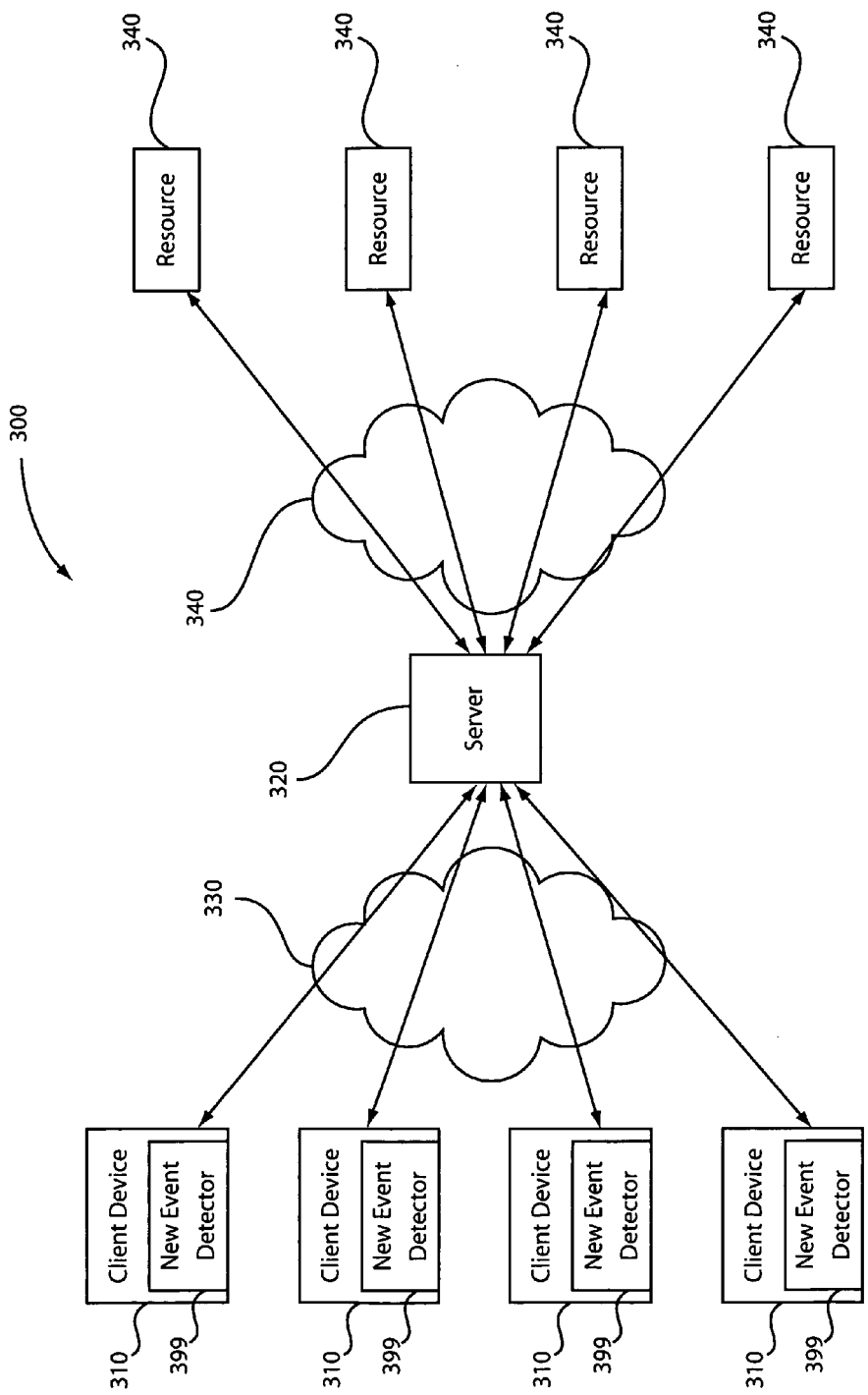
FIG. 3 is a block diagram showing an exemplary document streaming networked environment to which the present principles may be applied, in accordance with an embodiment of the present principles.

Referring now to the drawings in which like numerals represent the same or similar elements and initially to FIG. 3, an exemplary document streaming networked environment to which the present principles may be applied, is indicated generally by the reference numeral 300. The environment 300 includes one or more client devices 310 connected to a server 320 via a network 330. The network 330 may include wired and/or wireless links. The server 320 may be connected in signal communication with one or more resources 340. The resources 340 may include one or more local and/or remote sources. The resources 340 may be connected to the server 320 directly and/or via, e.g., one or more networks 340 (including wired and/or wireless links). Each of the client devices 310 may include a resource-adaptive, real-time new event detector 399 for detecting new events as described herein.

Figure 4:
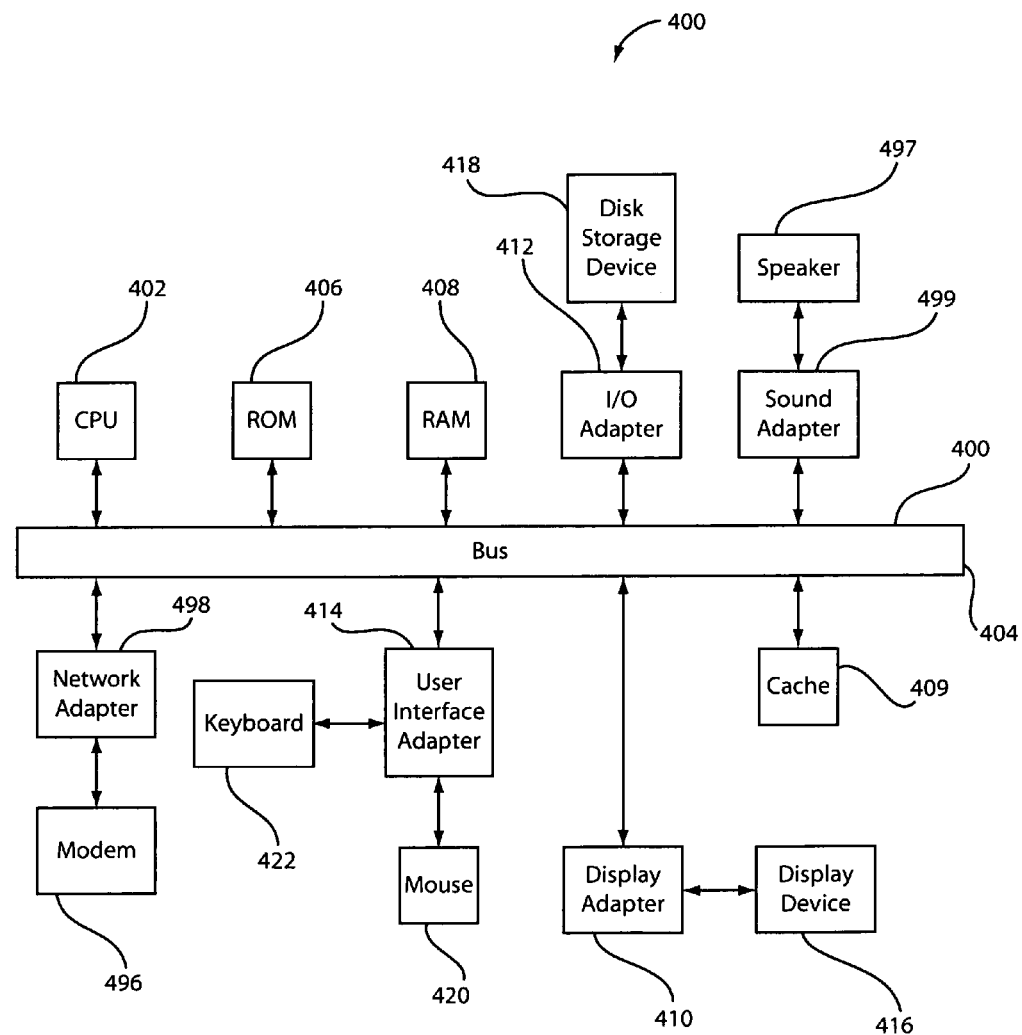
FIG. 4 is a block diagram showing an exemplary computing device to which the present principles may be applied, in accordance with an embodiment of the present principles.

Turning to FIG. 4, an exemplary computing device to which the present principles may be applied is indicated generally by the reference numeral 400. It is to be appreciated that elements of the computing device 400 may be employed in any of the client devices 310, the server 320, and/or the resources 340 of FIG. 3. Moreover, it is to be further appreciated that elements of the computing device 400 may be employed in the resource-adaptive, real-time new event detector 399 of FIG. 3.

The computing device 400 includes at least one processor (CPU) 402 operatively coupled to other components via a system bus 404. A read only memory (ROM) 406, a random access memory (RAM) 408, a display adapter 410, an I/O adapter 412, a user interface adapter 414, a sound adapter 499, and a network adapter 498, are operatively coupled to the system bus 404.

A display device 416 is operatively coupled to system bus 404 by display adapter 410. A disk storage device (e.g., a magnetic or optical disk storage device) 418 is operatively coupled to system bus 404 by I/O adapter 412.

A mouse 420 and keyboard 422 are operatively coupled to system bus 404 by user interface adapter 414. The mouse 420 and keyboard 422 are used to input and output information to and from system 400.

At least one speaker (herein after "speaker") 497 is operatively coupled to system bus 404 by sound adapter 499. A (digital and/or analog) modem 496 is operatively coupled to system bus 404 by network adapter 498.

In an embodiment, a comprehensive framework for online new event detection (ONED) is disclosed that covers a large design space. Within this framework, a system and method are disclosed for resource-adaptive, real-time new event detection.

Embodiments relating to the disclosed system and method may involve from one up to at least four perspectives that improve new event detection over prior art approaches. First, various indexing and compression methods may be used to increase the document processing rate by orders of magnitude without sacrificing much detection accuracy. Second, when resources are tight, the system and method of the present principles may be configured to focus on the important documents and attempt to maximize the benefit that can be gained from the limited resources. Third, when the new event arrival rate is beyond the processing capability of the consumer of the ONED system, the system and method of the present principles may be configured to avoid overwhelming the user by further filtering and prioritizing new events before presenting them to the consumer. Fourth, the importance of document sources may be computed, which can be used to guide the selection of document sources.

The main challenge in improving efficiency and effectively using the limited resources is to minimize the amount of saved information without losing much information that is critical for the detection accuracy. Regarding providing a friendly user interface, the main challenge is to decide the relative importance of different documents. For this purpose, in an embodiment, we use the intermediate computation results of ONED to determine which documents' contents are repeated by the other documents that arrive later, and automatically create implicit citation relationships among all the documents. Those documents with a large number of citations are considered important. At the same time, citations among documents are merged together to obtain linking relationships among document sources, which are used to compute the importance of document sources.

To set the stage for the discussion of our techniques, an exemplary baseline ONED system to which the present principles may be applied will now be described in accordance with an embodiment of the present principles. Of course, it is to be appreciated that the present principles are not limited to solely this ONED system and, thus, one of ordinary skill in this and related arts will contemplate this and other ONED systems to which the present principles, while maintaining the scope of the present principles. This baseline system is similar to the ONED system disclosed by Braun et al., in "Exploiting Topic Pragmatics for New Event Detection in TDT-2004", Topic Detection and Tracking 2004 Workshop, Dec. 2-3, 2004, available at http://www.nist.gov/speech/tests/tdt/tdt2004/papers/SHAI-TDT2004 Paper.htm, the disclosure of which is incorporated by reference herein. This baseline system achieved the best detection accuracy in the latest TDT5 competition.

Following the convention of information retrieval literature, "vocabulary" denotes the set of all distinct words, "term" denotes a word, and a "first-story document" denotes a document that describes a previously unmentioned event. That is, a "first-story" document mentions an event previously unmentioned in other documents that have been already captured and/or otherwise processed by the new event detector of the present principles.

The baseline system uses a variant of the state-of-the-art Okapi formula to compute both term weights and the similarity values of document pairs. We first give a brief summary of the Okapi approach. In the Okapi approach, both documents and queries are represented as vectors. Each element of a vector is the weight of a term in the vocabulary. Terms that are important to a document are assigned large weights. Terms that do not appear in the document have zero weights. The relevance between a document D and a query Q is computed as the inner product of D's vector and Q's vector. The intuition behind the Okapi approach is that the more times a term t appears in a document D and the fewer times t appears in other documents (i.e., the less popular t is in other documents), the more important t is for D. Also, the Okapi approach considers the effect that longer documents have more words that should be compensated by normalizing for document lengths.

Consider a document set S. For each term t in the vocabulary and a document D∈S, Okapi uses the following formulas:

$$w_{tf} = \frac{(k_1 + 1)tf}{k_1[(1-b) + b \times dl/avdl] + tf}, \quad \text{term frequency } (tf) \text{ weight} \tag{f1}$$

$$w_{idf} = \ln\frac{N - df + 0.5}{df + 0.5}. \quad \text{inverse document frequency } (idf) \text{ weight} \tag{f2}$$

Here tf is t's frequency (i.e., number of occurrences) in D, N is the total number of documents in S, df is the number of documents in S that include t, dl is the length of D in bytes, and avdl is the average length (in bytes) of all the documents in S. b and $k_1$ are two predetermined constants. Typically, the following values may be used for b and $k_1$, as suggested by A. Singhal, in "Modern Information Retrieval: A Brief Overview", IEEE Data Engineering Bulletin 24(4): 35-43, December 2001, the disclosure of which is incorporated by reference herein: b=0.75 and $k_1$=1.2. Of course, other values may be used for b and $k_1$, while maintaining the scope of the present principles.

Consider a query Q. For each document D∈S, the Okapi approach defines its score (i.e., the degree of relevance for answering Q) as the sum of term weights of all the terms that appear in both D and Q. Each term weight is computed using the tf weight for D, the tf weight for Q, and the idf weight. In the case of ONED, we need to compute the similarity value between two documents $D_1 \in S$ and $D_2 \in S$. Hence, we modify the Okapi approach to fit our purpose: the similarity value between $D_1$ and $D_2$ is computed as the inner product of $D_1$'s vector and $D_2$'s vector. More specifically, for either document $D_i$ (i=1, 2), a tf weight $w_{tf,i}$ is computed. The term weight is defined according to (f3). The similarity value is computed according to (f4), where the sum is over all the terms that appear in both $D_1$ and $D_2$.

$$w_t = w_{tf.1} \times w_{tf.2} \times w_{idf}, \quad \text{(f3)}$$

$$\text{similarity}_{D_1,D_2} = \sum_{t \in D_1,D_2} w_t. \quad \text{(f4)}$$

In the above computation, the similarity value is not normalized to [0, 1], as the Okapi approach has already normalized for document lengths.

In an embodiment, the following may be implemented by the baseline system. As standard pre-processing operations in information retrieval, for each document, (1) stemming is performed (e.g., using the standard Porter stemmer), and (2) stopwords are removed (e.g., by using the standard SMART stopword list). In a document streaming environment, the document set S keeps changing as new documents continue to arrive. As mentioned in the above-referenced article by Braun et al., entitled "Exploiting Topic Pragmatics for New Event Detection in TDT-2004", the computation of the tf and idf weights can be based on a static document set S' (such as the TDT4 document set) that has similar characteristics as S. For a term that does not exist in S', its df is treated as one. Compared to the method that incrementally updates the statistics N, avdl, and df, this static method has lower overhead while the detection accuracy remains roughly the same.

When a new document D arrives, D is first pre-processed and its information is saved in memory. Then D is compared to all the old documents that arrived in the past. If all the similarity values between D and the old documents are below a threshold T, D is predicted to mention a new event. In this case, D is put into the output queue, waiting to be consumed. Otherwise, if the similarity value between D and an old document $D_{old}$ is above T, then D is predicted to mention the same event as $D_{old}$ and is, thus, not considered as a first-story document.

Figure 5:
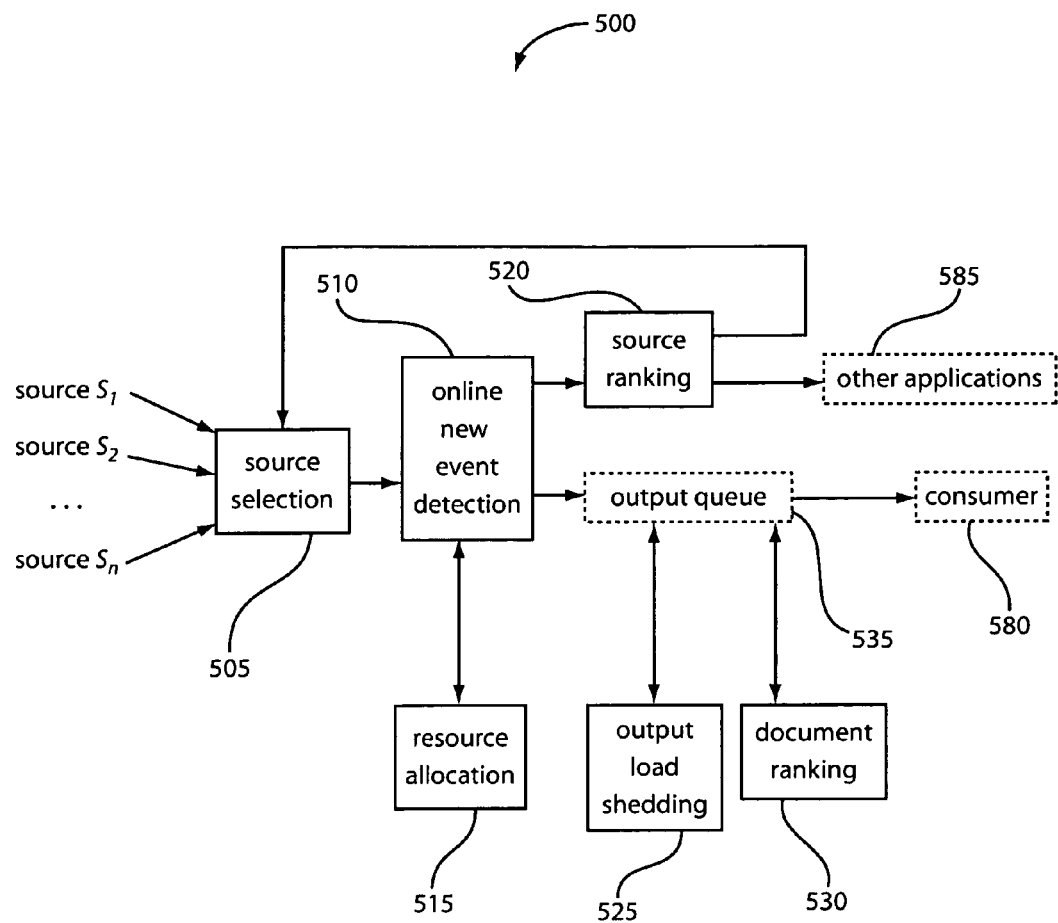
FIG. 5 is a block diagram showing an exemplary general framework for online new event detection (ONED) in accordance with an embodiment of the present principles.

In accordance with an embodiment, a description will now be given regarding a general framework for online new event detection (ONED). Turning to FIG. 5, an exemplary general framework for online new event detection (ONED) is indicated generally by the reference numeral 500. It is to be appreciated that the framework 500 may be implemented, for example, by the new event detector 399 shown and described with respect to FIG. 3, as well as one or more of the elements of the computing device 400 shown and described with respect to FIG. 4. The framework 500 includes a source selector 505, an online new event detection (ONED) system 510 (also referred to herein as "new event detector"), a resource allocation module 515, a source ranker 520, an output loader shredder 525, and a document ranker 530. The ONED system 510, the output load shredder 525, and the document ranker 530 may be connected to an output queue $Q_o$ 535 (hereinafter also referred to as "output queue" 535). The output queue 535 may be further connected to a consumer 580. The source ranker 520 may be connected to other applications 585.

Figure 2:
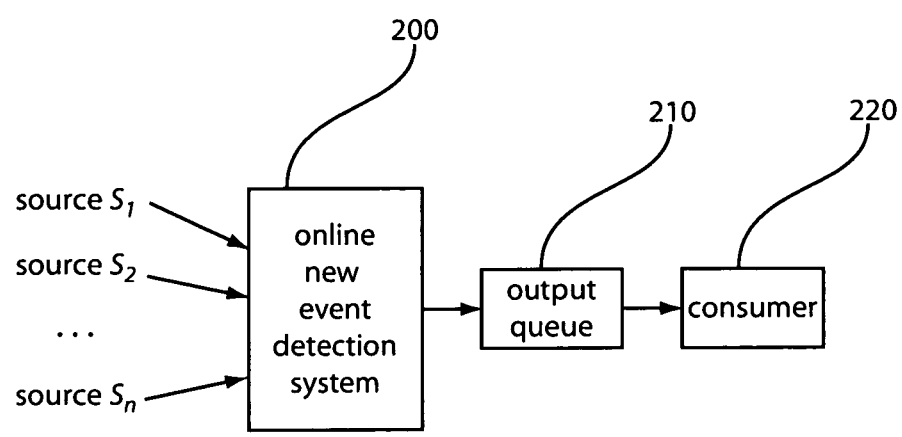
FIG. 2 is a block diagram showing a conventional online new event detection system (ONED) according to the prior art.

This framework 500 defines a fairly large design space and is much more general than the traditional ONED system shown in FIG. 2.

The source selector 505 determines the document sources from which documents are received. Documents from these selected sources are fed to the ONED system 510, where first-story documents are identified. The identified first-story documents are sent to the output queue $Q_o$ 535, waiting to be processed by the consumer 580 of the ONED system 510. When resources are tight, the resource allocation module 515 determines how to maximize the benefit that can be gained from the limited resources. When the consumer 580 is overloaded and cannot keep pace with the output rate of the ONED 510, the output load shedder 525 determines which documents in the output queue $Q_o$ 535 should be dropped or moved to a low-priority queue (waiting there until the consumer 580 becomes free). The document ranker 530 determines the order in which documents in the output queue $Q_o$ 515 are presented to the consumer 580.

It is to be appreciated that the output queue $Q_o$ 515 may be used to store documents and/or portions thereof and/or information relating thereto.

The source ranker 520 takes the information generated by the ONED system 510 as an input to compute the relative importance of document sources. This "importance information" is sent back to the source selector 505 to guide the selection of document sources. Other applications 585 can also use this importance information for their own purposes including, but not limited to, e.g., online advertisement. Hereinafter, the elements of the framework 500 are described in further detail. Advantageously, it is to be appreciated that any of the parameters used in our algorithms can be dynamically adjusted according to the real-time load on the system.

Figure 6:
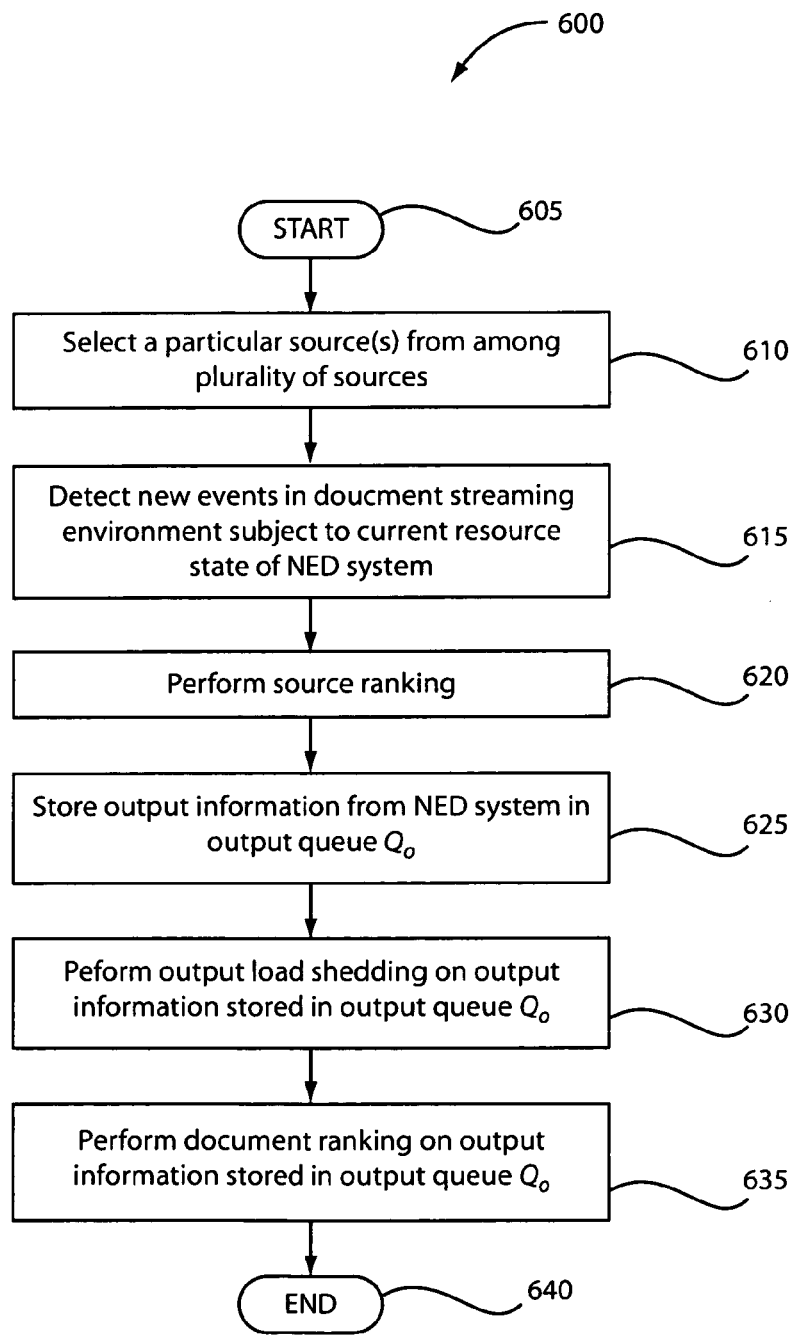
FIG. 6 is a flow diagram showing an exemplary method for resource-adaptive, real-time new event detection in a new event detection (NED) system, in accordance with an embodiment of the present principles.

Turning to FIG. 6, an exemplary method for resource-adaptive, real-time new event detection in a new event detection (NED) system is indicated generally by the reference numeral 600. The method 600 includes a start block 605 that passes control to a function block 610. The function block 610 selects a particular source(s) from among a plurality of sources, and passes control to a function block 615. The function block 615 detects new events in a document streaming environment subject to a current resource state of the NED system, and passes control to a function block 620. The function block 620 performs source ranking to provide a ranking of one or more of the plurality of sources (for use by the function block 610 in selecting the particular source(s)), and passes control to a function block 625. The function block 625 stores output information from the NED system in the output queue, and passes control to a function block 630. The function block 630 performs output load shedding on the output information stored in the output queue, and passes control to a function block 635. The function block 635 performs document ranking on the output information stored in the output queue, and passes control to an end block 640.

In accordance with various exemplary embodiments of the present principles, various techniques are disclosed for improving the efficiency of an ONED system (e.g., such as the ONED system 510 shown and described with respect to FIG. 5). The baseline system described herein above has at least two shortcomings regarding efficiency. First, as new documents continue to arrive, the number of previously arrived documents keeps increasing, and eventually the memory will not be able to hold the information for all the old documents. However, due to the real-time nature of ONED, generally all the data structures that are used should be kept in memory to avoid expensive input/output (I/O) operations. Second, it is expensive to compare a new document with all the old ones. To reduce both storage and computation overhead, we limit both the number of saved documents and the number of terms kept for each saved document without sacrificing much detection accuracy. Here saved documents refer to the ones whose information is saved in memory.

An embodiment directed to improving efficiency by reducing the number of saved documents will now be described. Typically, the discussion of an event lasts for a finite amount of time in news articles, and a new document is unlikely to mention the same event as a document that is fairly old. Hence, documents that are too old are not very useful and we only keep in memory the information of those old documents that are within a sliding window of the last W days. Here W is a predetermined constant. Once an old document expires from this sliding window, its information may be immediately discarded.

Typically, an event is mentioned by a large number of documents. Only one of these documents is the first-story document. For example, in the TDT5 document set, for the 250 specified events, on average each event is mentioned by 40 documents. All the documents that mention the same event tend to be similar to each other. Therefore, it is an overkill to compare a new document with all the old documents that mention the same event. Instead, in an embodiment, we only keep the information of the first-story documents. When a new document D arrives, D is compared with the old first-story documents. If D is predicted to be a first-story document that mentions a new event, D's information is saved in memory. Otherwise D is discarded.

Figure 7:
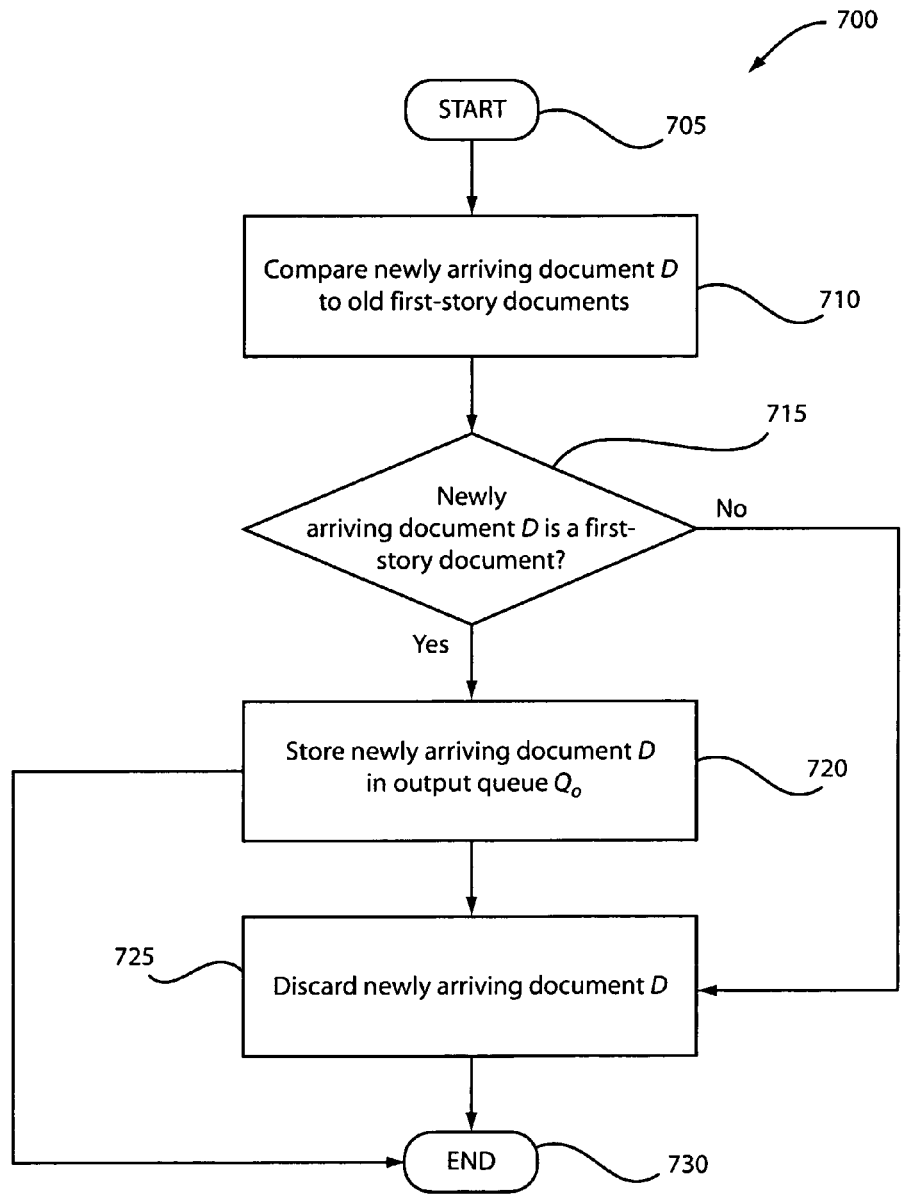
FIG. 7 is a flow diagram showing an exemplary method for reducing the number of saved documents, in accordance with an embodiment of the present principles.

Turning to FIG. 7, an exemplary method for reducing the number of saved documents is indicated generally by the reference numeral 700. The method 700 includes a start block 705 that passes control to a function block 710. The function block 710 compares a newly arriving document D to old first-story documents, and passes control to a decision block 715. The decision block 715 determines whether or not the newly arriving document D is a first-story document that mentions a new event based on a result on the comparison performed by the function block 710. If so, then control is passed to a function block 720. Otherwise, control is passed to a function block 725.

The function block 720 stores the newly arriving document D in the output queue $Q_o$ 535, and passes control to an end block 730.

The function block 725 discards the newly arriving document D, and passes control to an end block 730.

An embodiment directed to improving efficiency by reducing the number of saved terms will now be described. All the terms in a document D can be sorted in descending order of their tf×idf values. In general, those terms with large tf×idf values are important to D. As has been observed by Allan et al., in "On-Line New Event Detection and Tracking", Annual International ACM SIGIR Conference on Research and Development in Information Retrieval, Aug. 24-28, 1998, Melbourne, Australia, pp. 37-45, the disclosure of which is incorporated by reference herein, that in computing the similarity value of two documents, we only need to use those important terms of the two documents, as those terms contribute to most of the similarity value. Hence, for each saved document, we only keep the top-K terms with the largest tf×idf values rather than all the terms. Here, K is a predetermined constant. Only the top-K terms are used to compute the similarity values of document pairs.

Figure 8:
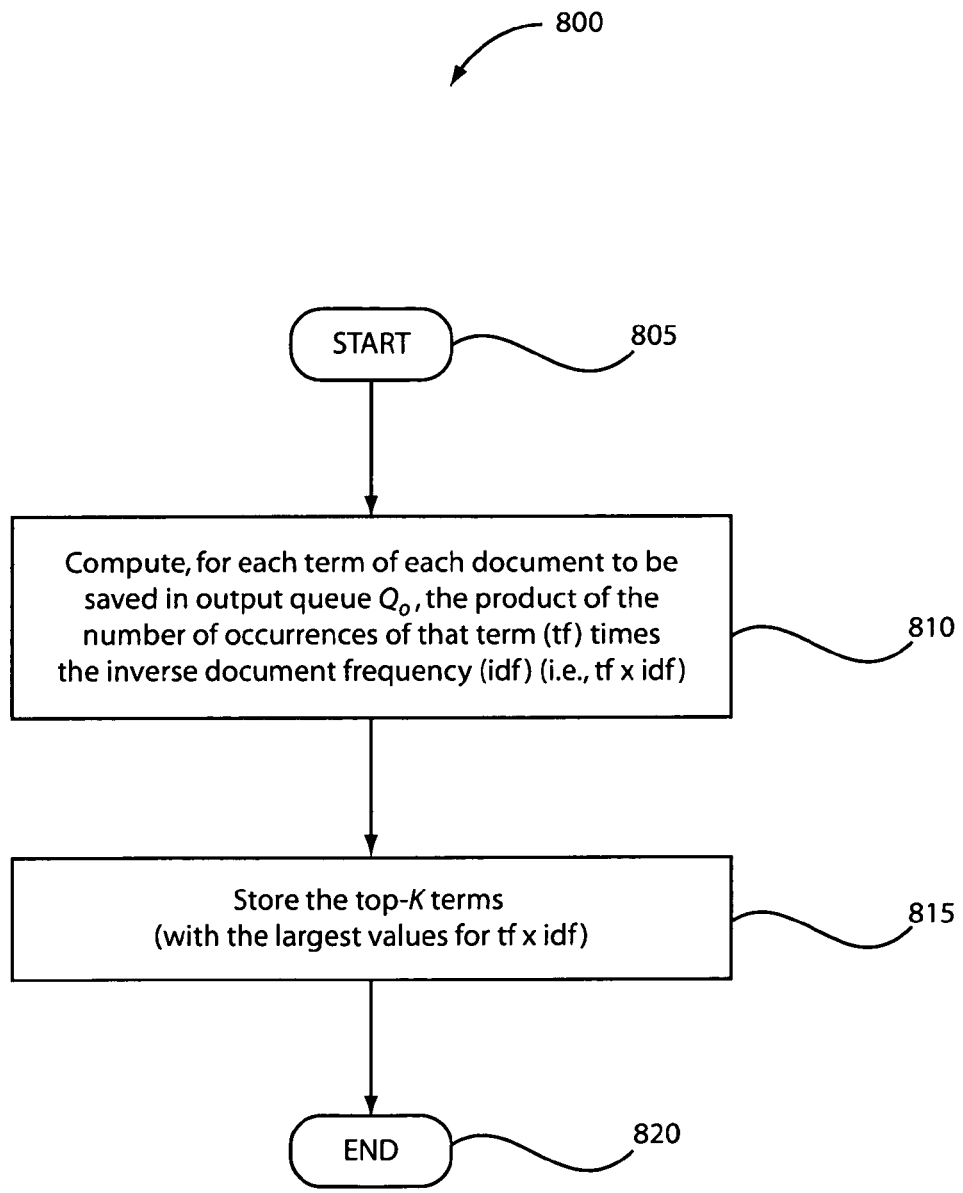
FIG. 8 is a flow diagram showing an exemplary method for reducing the number of saved terms, in accordance with an embodiment of the present principles.

Turning to FIG. 8, an exemplary method for reducing the number of saved terms is indicated generally by the reference numeral 800. The method 800 includes a start block 805 that passes control to a function block 810. The function block 810 computes, for each term of each document to be saved in the output queue, the product of the number of occurrences of that term (tf) times the inverse document frequency (idf), namely tf×idf, and passes control to a function block 815. The function block 815 stores the top-K terms (with the largest values for the product of the number of occurrences times the inverse document frequency, namely tf×idf), and passes control to an end block 820.

An embodiment directed to improving efficiency by pre-filtering will now be described. To reduce the overhead of computing similarity values, a pre-filtering technique is used. Our idea is to use a low-overhead method to quickly filter out most of the documents that mention different events from the new document. In this way, we can substantially reduce the number of similarity values that need to be computed. Consider two documents $D_1$ and $D_2$. If $D_1$ and $D_2$ mention the same event E, their top terms tend to have some overlap. That is, some term(s) describing E is likely to appear in the top terms of both $D_1$ and $D_2$. Thus, top terms can be used to quickly filter out unnecessary computations. More specifically, we have a predetermined constant M (M≤K). Before computing the similarity value of $D_1$ and $D_2$, we first check whether the top-M terms of $D_1$ and $D_2$ intersect. If so, we continue to compute the similarity value of $D_1$ and $D_2$. Otherwise, we predict that $D_1$ and $D_2$ mention different events and do not compute their similarity value.

Figure 9:
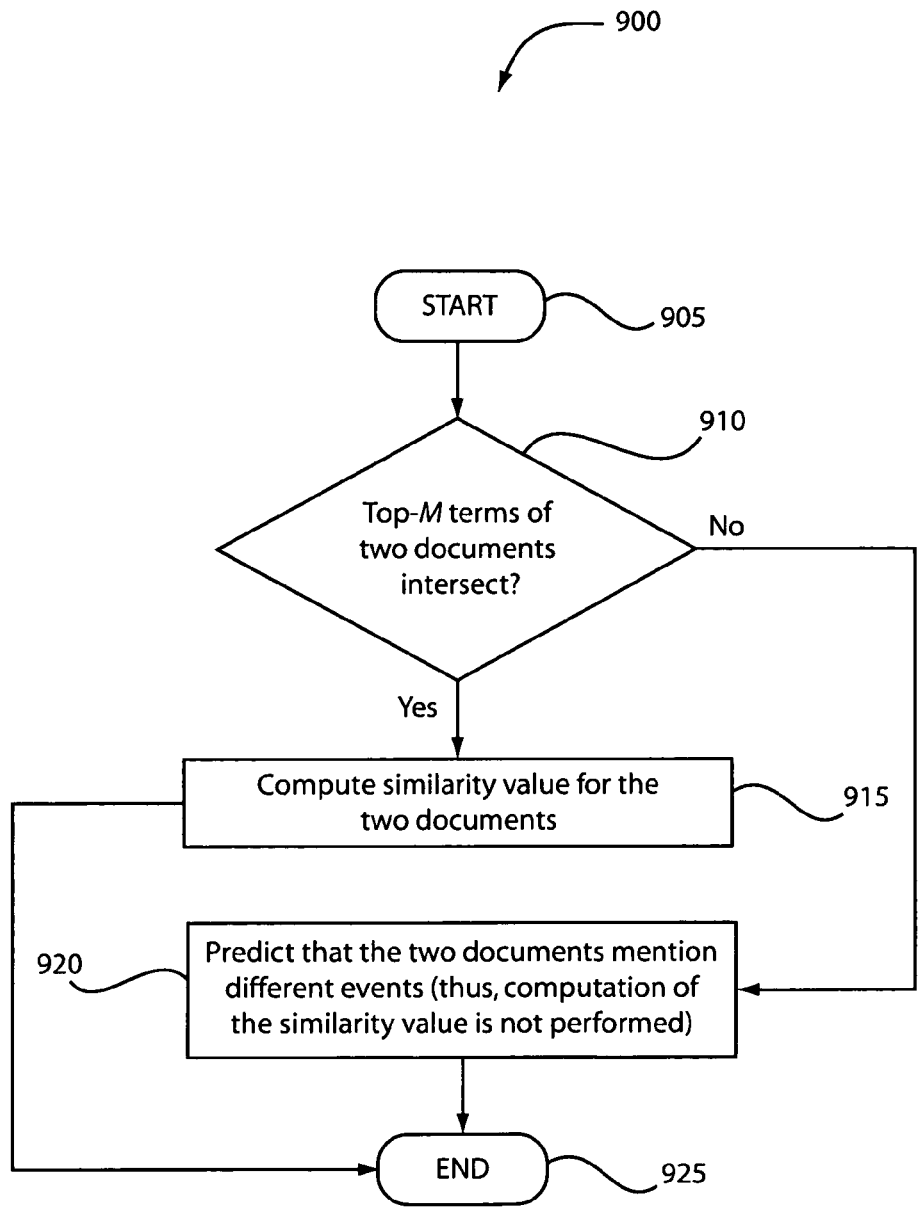
FIG. 9 is a flow diagram showing an exemplary method for pre-filtering, in accordance with an embodiment of the present principles.

Turning to FIG. 9, an exemplary method for pre-filtering is indicated generally by the reference numeral 900. The method 900 includes a start block 905 that passes control to a decision block 910. The decision block 910 determines whether or not the top-M terms of two documents intersect. If so, then control is passed to a function block 915. Otherwise, control is passed to a function block 920.

The function block 915 computes a similarity value for the two documents, and passes control to an end block 925.

The function block 920 predicts that the two documents mention different events (and, thus, the computation of the similarity value is not performed), and passes control to the end block 925.

An embodiment directed to improving efficiency by building indices will now be described. We build indices to avoid unnecessary processing of the documents that have been pre-filtered out. Each term in the vocabulary has a term id (identifier). Each document has a doc id corresponding to its arrival time.

Figure 10:
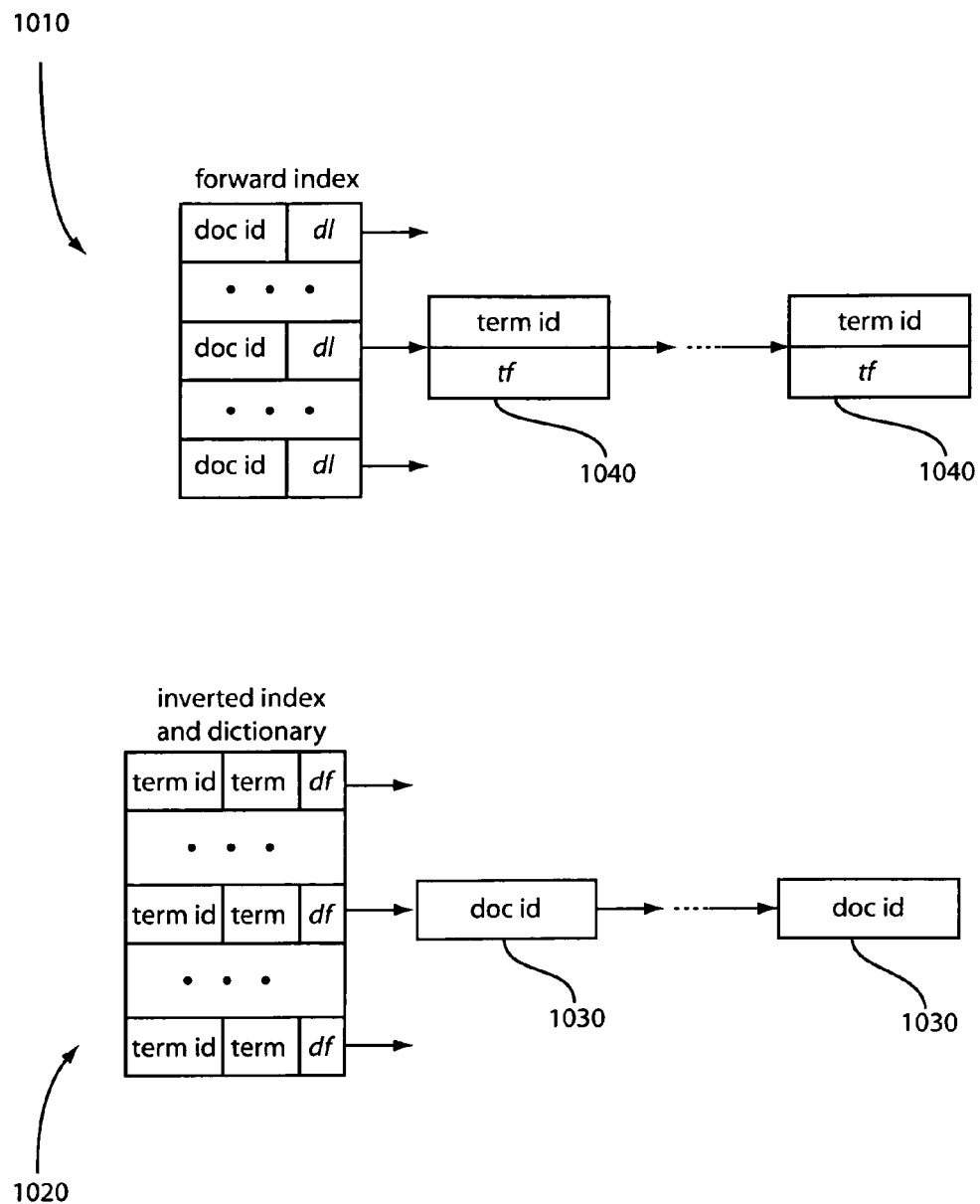
FIG. 10 is a block diagram showing exemplary index data structures, in accordance with an embodiment of the present principles.

Turning to FIG. 10, exemplary index data structures are indicated generally by the reference numeral 1000. Two indices are kept for all the saved documents: a forward index 1010; and an inverted index 1020. The forward index 1010 has an entry for each saved document. These entries are sorted in descending order of documents' arrival time. This allows us to quickly identify and drop the information of those documents that have expired from the sliding window of the last W days (see the description of the embodiment relating to improving efficiency by reducing the number of saved documents). For each saved document, the corresponding entry keeps the document length dl and the top-K terms associated with their term frequencies tf (see the description of the embodiment relating to improving efficiency by reducing the number of saved terms). These terms are sorted in ascending order of their term ids 1040. Consequently, the similarity value of two documents can be computed through an efficient "merge" of their term lists.

For each saved document, only its top-M terms are tracked by the inverted index 1020. The inverted index 1020 has an entry for each term in the vocabulary. The entry for term t is a posting (linked) list of the doc ids 1030 of all the documents whose top-M terms include t. These doc ids 1030 are sorted in descending order so that merging posting lists can be done efficiently. Since typically M<<K, the document-term information in the inverted index 1020 is only a subset of that in the forward index 1010. When a new document D arrives, we only scan the M posting lists that correspond to D's top-M terms. These M posting lists are merged together to find the doc ids 1030 of the candidate documents that may mention the same event as D. This is the pre-filtering technique described above. Then, for each such candidate document $D_c$, the forward index 1010 is used to compute the similarity value of D and $D_c$. The similarity value computation is performed at the same time that candidate doc ids 1030 are generated. In this way, if the similarity value of D and an old document is greater than the threshold T, D is predicted to be a non-first-story document and the processing for D may be stopped immediately. Otherwise, if D is predicted to be a first-story document, then D's information can be easily added into the inverted index 1020, as D's doc id 1030 is larger than the doc ids 1030 of the saved documents.

Figure 11:
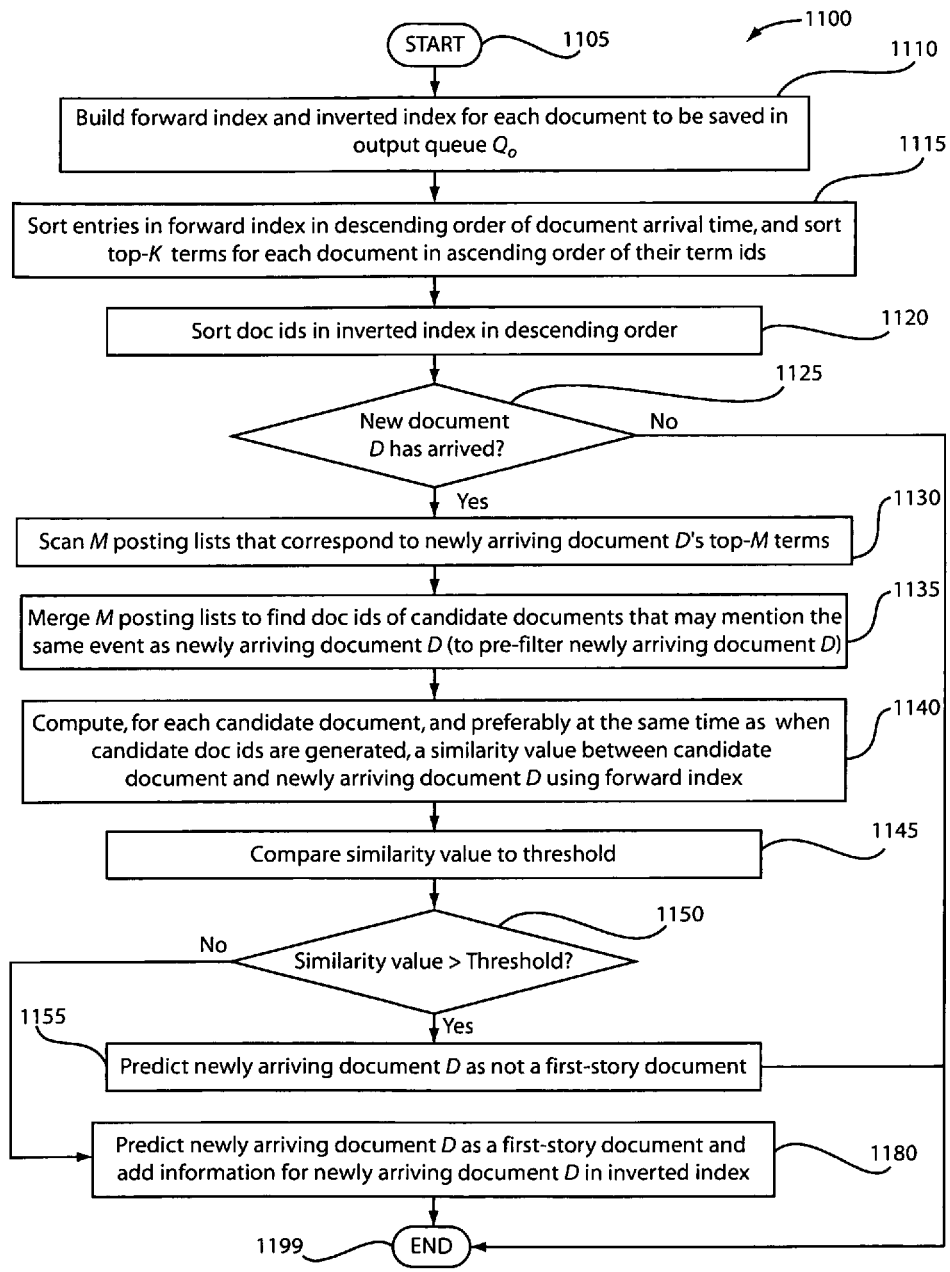
FIG. 11 is a flow diagram showing an exemplary method for building indices, in accordance with an embodiment of the present principles.

Turning to FIG. 11, an exemplary method for building indices is indicated generally by the reference numeral 1100. The method 1100 includes a start block 1105 that passes control to a function block 1110. The function block 1110 builds a forward index and an inverted index for each document to be saved in the output queue, and passes control to a function block 1115.

Each entry in the forward index specifies the document id and the document length of each of the documents. The inverted index includes an entry for each term in the vocabulary. The entry for a particular term in the inverted index is a linked list of the doc ids of all documents whose top-M terms include the particular term. Thus, each entry in the inverted index specifies the term id, the term, and the number of documents in a document set that include the particular term.

The function block 1115 sorts the entries in the forward index in descending order of document arrival time (to allow for a quick determination of the documents that have expired based upon a sliding window of the last W days), and sorts the top-K terms for each document in ascending order of their term ids, and passes control to a function block 1120.

The function block 1120 sorts doc ids in the inverted index in descending order, and passes control to a decision block 1125. The decision block 1125 determines whether or not a new document D has arrived. If so, then control is passed to a function block 1130. Otherwise, control is passed to an end block 1199.

The function block 1130 scans the M posting lists that correspond to the newly arriving document D's top-M terms, and passes control to a function block 1135. The function block 1135 merges the M posting lists to find the doc ids of the candidate documents that may mention the same event as the newly arriving document D (so as to pre-filter the newly arriving document), and passes control to a function block 1140. The function block 1140 computes, for each candidate document, and preferably at the same time as when candidate doc ids are generated, a similarity value between the candidate document and the newly arriving document D using the forward index, and passes control to a function block 1145. The function block 1145 compares the similarity value to a threshold, and passes control to a decision block 1150. The decision block 1150 determines whether or not the similarity value is greater than the threshold. If so, then control is passed to a function block 1155. Otherwise, control is passed to a function block 1180.

The function block 1155 predicts that the newly arriving document D is not a first-story document, and passes control to the end block 1199.

The function block 1180 predicts the newly arriving document D to be a first-story document, adds information for the newly arriving document in the inverted index, and passes control to the end block 1199.

An embodiment directed to improving efficiency by parallel processing will now be described. The above discussion may be implemented with respect to a single computer. However, it is to be appreciated that our framework can be naturally extended to use a cluster (e.g., C) of computers to process incoming documents at a higher rate.

Figure 12:
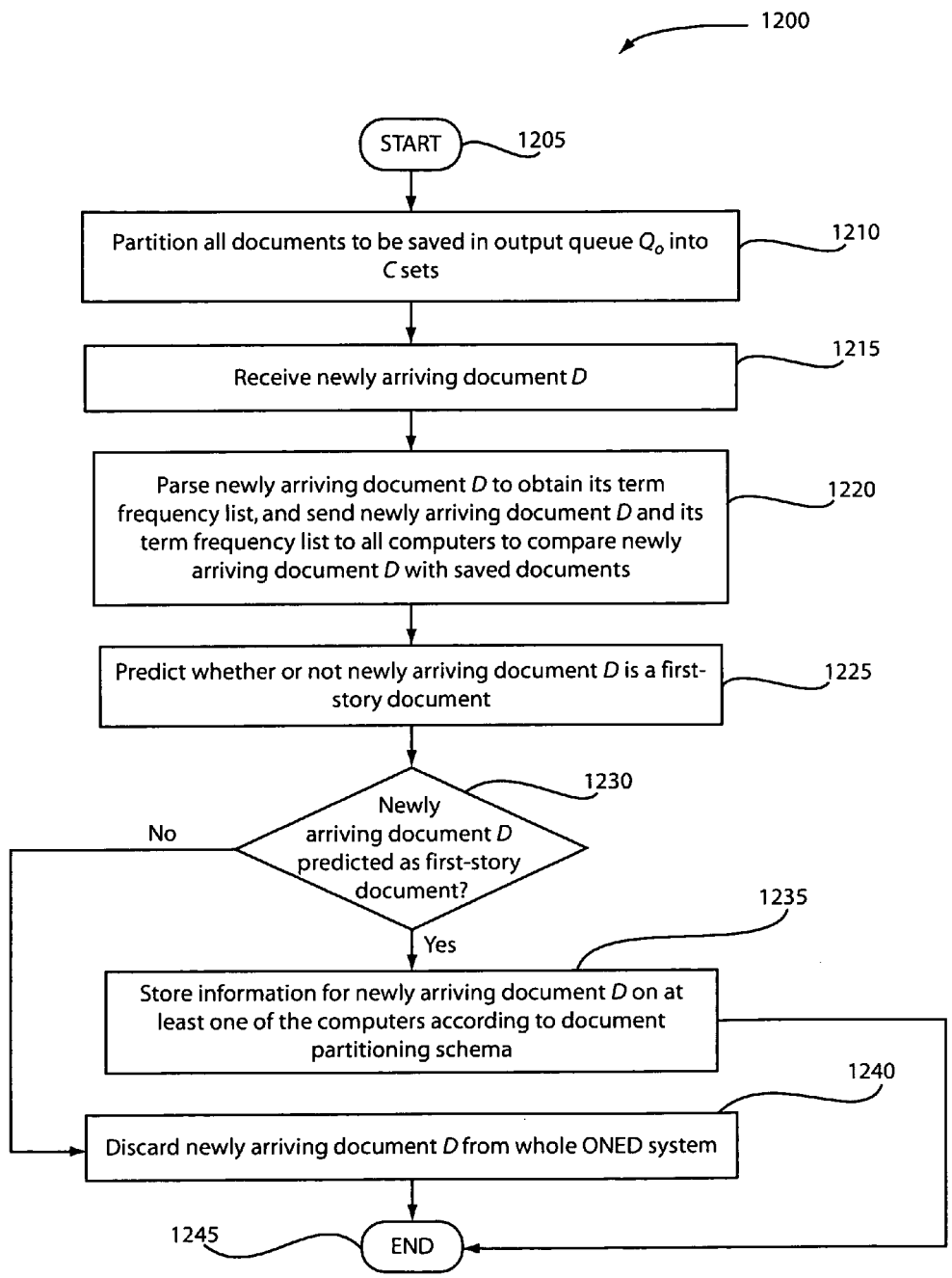
FIG. 12 is a flow diagram showing an exemplary method for parallel processing, in accordance with an embodiment of the present principles.

Turning to FIG. 12, an exemplary method for parallel processing is indicated generally by the reference numeral 1200. The method 1200 includes a start block 1205 that passes control to a function block 1210. The function block 1210 partitions all the documents to be saved in the output queue into C sets (e.g., using round-robin partitioning), and passes control to a function block 1215. The function block 1215 receives a newly arriving document D, and passes control to a function block 1220. The function block 1220 parses the newly arriving document D on one computer to obtain its term frequency list, sends the newly arriving document D and its term frequency list to all the computers to compare the newly arriving document D with saved documents, and passes control to a function block 1225. The function block 1225 predicts, using any of the computers, whether or not the newly arriving document D is a first-story document, and passes control to a decision block 1230. The decision block 1230 determines whether or not any of the computers has predicted the newly arriving document D as a first-story document. If so, then control is passed to a function block 1235. Otherwise, control is passed to a function block 1240.

The function block 1235 stores information for the newly arriving document D on at least one of the computers according to the document partitioning schema, and passes control to an end block 1245.

The function block 1240 discards the newly arriving document D from the whole ONED system, and passes control to the end block 1245.

An embodiment directed to effective resource utilization will now be described. If the arrival rate of first-story documents is high (e.g., due to the bursty nature of document streams), then the memory may not be able to hold the information for all the identified first-story documents within the last W days. When this happens, the information of some saved documents should be removed from memory. One goal of the resource allocation module 515 of FIG. 5 is to minimize the loss in detection accuracy.

We first introduce a definition that will be used herein after: Implicit citation (or simply citation): When a non-first-story document $D_{nf}$ arrives, if $D_{nf}$ mentions the same event as a first-story document D that arrived before, we say that D is cited by $D_{nf}$ once.

Intuitively, to minimize the loss in detection accuracy, we need to keep in memory the information of those documents that will be cited by a large number of documents in the future. If we treat memory as a cache and citations as cache hits, this becomes a cache management problem. Hence, we can use a traditional cache management algorithm such as Least Recently Used (LRU) to manage all the saved documents in memory.

An embodiment directed to output load shedding with respect to a user interface will now be described. In practice, the processing rate of the consumer 580 can be slower than the output rate of the ONED system 510, particularly when a burst of first-story documents arrive. In this case, some documents need to be dropped from the output queue $Q_o$ 535 so that the consumer 580 will not become overloaded. The output load shedder 525 strives to minimize this impact by dropping less important documents from output queue $Q_o$ 535.

Intuitively, the importance of a document D is measured by the importance of the event E mentioned by D, and the importance of E is related to the number of documents mentioning E. We use the following method to judge the importance of a first-story document D. The total number of citations that D has received so far and will receive in the future is referred to herein as the final citation number of D, which is denoted as $C_{final}(D)$ and reflects the importance of D. As a companion concept, the number of citations that D has received so far is referred to herein as the current citation number of D, which is denoted as $C_{current}(D)$.

To avoid overwhelming the consumer 580, the size of the output queue $Q_o$ 535 is fixed. Documents are removed from the output queue $Q_o$ 535 when they are consumed by the consumer. When the output queue $Q_o$ 535 becomes full, some document must be dropped from the output queue $Q_o$ 535 before a new document can be inserted into the output queue $Q_o$ 535. Intuitively, for the documents in the output queue $Q_o$ 535, their current citation numbers partially reflect their importance. Hence, we keep track of the current citation numbers of the documents in the output queue $Q_o$ 535. One naive policy is to drop from the output queue $Q_o$ 535 those documents with small current citation numbers. This policy, however, is unfair. Newly arrived documents tend to have small current citation numbers but they can be important if they will receive a large number of citations in the future. Thus, it is not desirable to always drop newly arrived documents in favor of those documents that arrived a long time ago. To address this problem, the output queue $Q_o$ 535 is split into two parts: the new part $Q_{o\_new}$ and the old part $Q_{o\_old}$. A newly arrived document D first stays in $Q_{o\_new}$ to accumulate citations. When D moves from $Q_{o\_new}$ to $Q_{o\_old}$, its current citation number has become close to its final citation number and can roughly reflect its importance. Documents in $Q_{o\_old}$ with small current citation numbers are considered as less important and thus the candidates to be dropped from $Q_o$.

In an embodiment, the output load shedding method is performed as follows. For each document in the output queue $Q_o$ 535, we use a counter to keep track of its current citation number. When a document D is first inserted into the output queue $Q_o$ 535, D's counter is initialized to zero. As described above, when a new document $D_{new}$ arrives at the ONED system 510, $D_{new}$ is compared with the saved documents in memory. If the similarity value between $D_{new}$ and a saved document $D_{old}$ is above the threshold T, then $D_{new}$ is predicted to mention the same event as $D_{old}$. That is, $D_{old}$ is cited by $D_{new}$ once. In this case, if $D_{old}$ still exists in the output queue $Q_o$ 535, then $D_{old}$'s counter is incremented by one.

Figure 13:
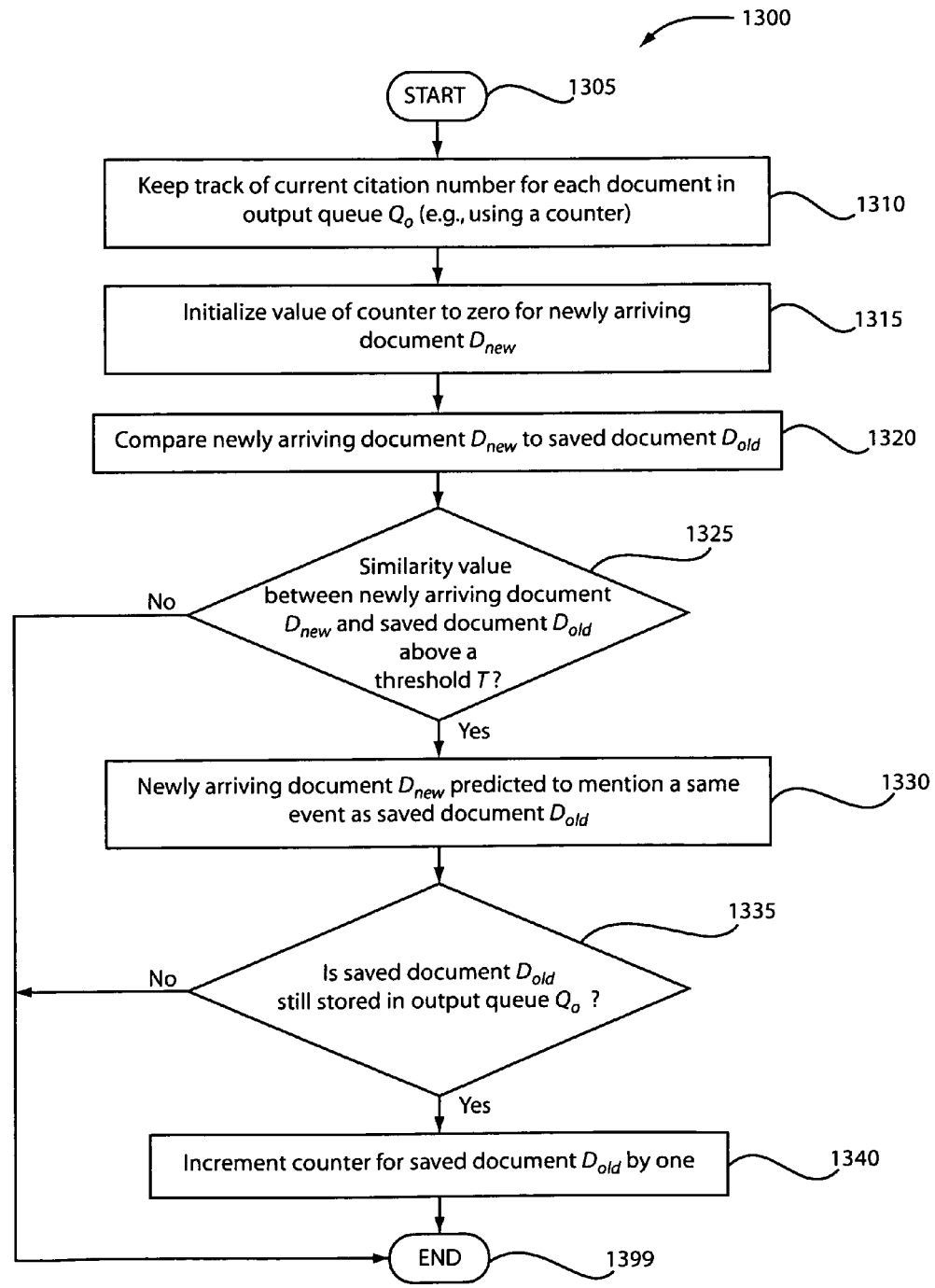
FIG. 13 is a flow diagram showing an exemplary method for citation tracking for output load shedding, in accordance with an embodiment of the present principles.

Turning to FIG. 13, an exemplary method for citation tracking for output load shedding is indicated generally by the reference numeral 1300. The method 1300 includes a start block 1305 that passes control to a function block 1310. The function block 1310 keeps track of a current citation number for each document in the output queue $Q_o$ 535 (e.g., using a counter), and passes control to a function block 1315. The function block 1315 initializes a value of a counter to zero for a newly arriving document $D_{new}$, the counter representing a number of citations for the newly arriving document $D_{new}$, and passes control to a function block 1320. The function block 1320 compares the newly arriving document $D_{new}$, to a saved document $D_{old}$, and passes control to a decision block 1325. The decision block 1325 determines whether or not the similarity value between the newly arriving document $D_{new}$ and a saved document $D_{old}$ is above a threshold T. If so, then control is passed to a function block 1330. Otherwise, control is passed to an end block 1399.

The function block 1330 predicts the newly arriving document $D_{new}$ as mentioning a same event in the saved document $D_{old}$, and passes control to a decision block 1335. The decision block 1335 determines whether or not the saved document $D_{old}$ is still stored in the output queue $Q_o$ 535. If so, then control is passed to a function block 1340. Otherwise, control is passed to the end block 1399.

The function block 1340 increments the counter for the saved document $D_{old}$ by one (so as to increase the citation number of the saved document $D_{old}$), and passes control to the end block 1399.

The resource utilization method described above is revised slightly. The documents in the output queue $Q_o$ 535 are a subset of the saved documents in memory. When memory overflows, the information about the documents in $Q_o$ is never removed from memory, as this information is needed to keep track of the current citation numbers of the documents in the output queue $Q_o$ 535.

The output queue $Q_o$ 535 can hold at most N documents, where N is a constant specified by the consumer 580 of the ONED system 510. The output queue $Q_o$ 535 includes two parts: the new part $Q_{o\_new}$ and the old part $Q_{o\_old}$. $Q_{o\_new}$ is a First In First Out (FIFO) queue and can hold at most p×N documents, where p is a predetermined constant (0≤p≤1). $Q_{o\_old}$ can hold at most (1−p)×N documents. All the documents in $Q_{o\_old}$ are sorted in ascending order of their current citation numbers. The optimal value of p depends on both N and the document set. It can be determined using a training document set that has similar characteristics as the actual document set. Each time a first-story document D is identified, D is inserted into $Q_{o\_new}$. If $Q_{o\_new}$ is full, then the oldest document in $Q_{o\_new}$ is moved to $Q_{o\_old}$. If $Q_{o\_old}$ becomes full, then the document in $Q_{o\_old}$ that has the smallest current citation number is dropped.

Note that it is not desirable to use the LRU algorithm to manage $Q_{o\_old}$, because our optimization criterion is the citation number rather than the cache hit ratio. LRU can incorrectly drop the documents with large citations numbers if their last citations happened a long time ago. Our key observation is that a good policy should consider both document arrival time and current citation number. Our algorithm is one of the policies that consider these two factors.

Figure 14:
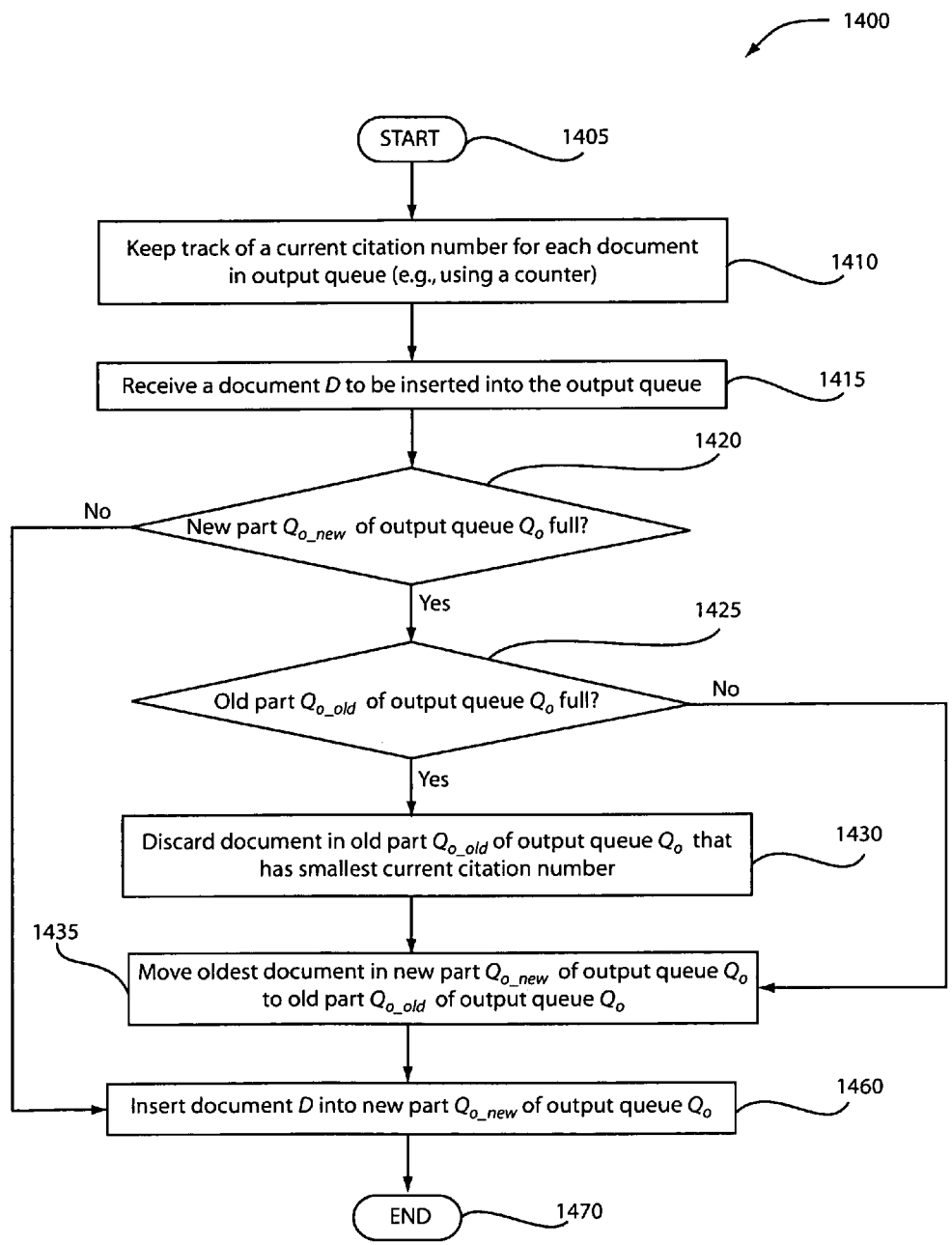
FIG. 14 is a flow diagram showing an exemplary method for output load shedding, in accordance with an embodiment of the present principles.

Turning to FIG. 14, an exemplary method for output load shedding is indicated generally by the reference numeral 1400. The method 1400 includes a start block 1405 that passes control to a function block 1410. The function block 1410 keeps track of a current citation number for each document stored in the output queue $Q_o$ 535 (e.g., using a counter), and passes control to a function block 1415.

The function block 1415 receives a document D to be inserted into the output queue $Q_o$ 535, and passes control to a decision block 1420. The decision block 1420 determines whether or not the new part $Q_{o\_new}$ of the output queue $Q_o$ 535 is full. If so, then control is passed to a decision block 1425. Otherwise, control is passed to a function block 1460.

The decision block 1425 determines whether or not the old part $Q_{o\_old}$ of the output queue $Q_o$ 535 is full. If so, then control is passed to a function block 1430. Otherwise, control is passed to a function block 1435.

The function block 1430 discards the document in the old part $Q_{o\_old}$ of the output queue $Q_o$ 535 that has the smallest current citation number, and passes control to a function block 1435.

The function block 1435 moves the oldest document in the new part $Q_{o\_new}$ of the output queue $Q_o$ 535 to the old part $Q_{o\_old}$ of the output queue $Q_o$ 535, and passes control to the function block 1460.

The function block 1460 inserts the document D into the new part $Q_{o\_new}$ of the output queue $Q_o$, and passes control to an end block 1470.

An embodiment directed to document ranking with respect to a user interface will now be described. When presenting results to the consumer 580, the document ranker 530 can sort the documents in the output queue 535 according to a criterion different from that used in the output load shedder 525. This allows the consumer 580 to process the desired documents first.

For this purpose, we keep a pointer queue $Q_r$ (the subscript r stands for rearrangement) that includes N pointers. Each pointer links to a different document in the output queue $Q_o$ 535. These pointers are sorted according to the policy that is specified by the document ranker 530. Documents in the output queue $Q_o$ 535 are presented to the consumer 580 in the order that their pointers are sorted in $Q_r$.

The document ranking policy depends on the concrete requirement of the consumer 580. One policy is to sort all the pointers in $Q_r$ in ascending order of the corresponding documents' arrival time. Consequently, the consumer 580 always processes the oldest document first.

A second policy is to sort all the pointers in $Q_r$ in descending order of the corresponding documents' importance (i.e., current citation numbers) so that the consumer 580 can see the currently-most-important document first. This policy may introduce starvation, as documents that arrive later and quickly accumulate a large number of citations can always jump ahead of a document that arrived earlier but does not receive citations any more.

Figure 15:
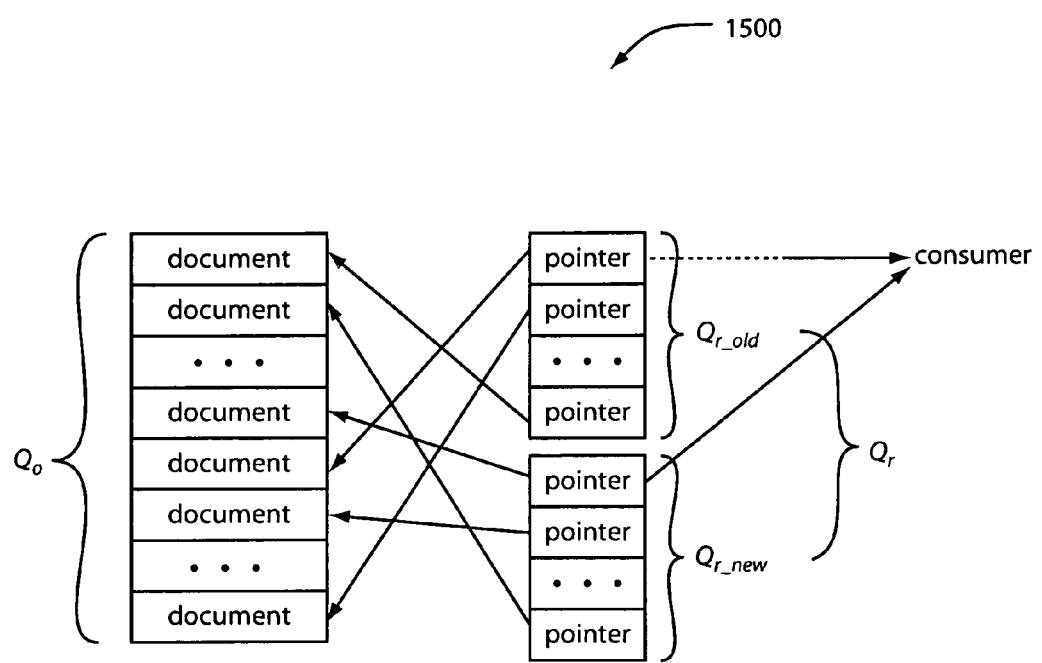
FIG. 15 is a diagram showing an exemplary arrangement of the output queue $Q_o$ 535 of FIG. 5, in accordance with an embodiment of the present principles.

One solution to address this problem is to break $Q_r$ into two queues: the new queue $Q_{r\_new}$ and the old queue $Q_{r\_old}$, as shown in FIG. 15. Turning to FIG. 15, an exemplary arrangement of the output queue $Q_o$ 535 of FIG. 5 is indicated generally by the reference numeral 1500. The output queue $Q_o$ 535, as noted above, includes the new queue $Q_{r\_new}$ and the old queue $Q_{r\_old}$. All the pointers in $Q_{r\_new}$ are sorted in descending order of the current citation numbers of the corresponding documents. All the pointers in $Q_{r\_old}$ are sorted in ascending order of the arrival time of the corresponding documents. When a document D is first inserted into the output queue $Q_o$ 535, the pointer to D is in $Q_{r\_new}$. After D has stayed in the output queue $Q_o$ 535 for a certain amount of time $T_c$, where $T_c$ is a constant specified by the consumer 580, the pointer to D is moved to $Q_{r\_old}$. Both the currently-most-important document (with the largest current citation number) whose pointer is in $Q_{r\_new}$ and the oldest document whose pointer is in $Q_{r\_old}$ are presented to the consumer 580 simultaneously. The consumer 580 determines which of these two documents to process first. This gives the oldest documents in the output queue $Q_o$ 535 a chance of being seen by the consumer 580 rather than getting starved.

Figure 16:
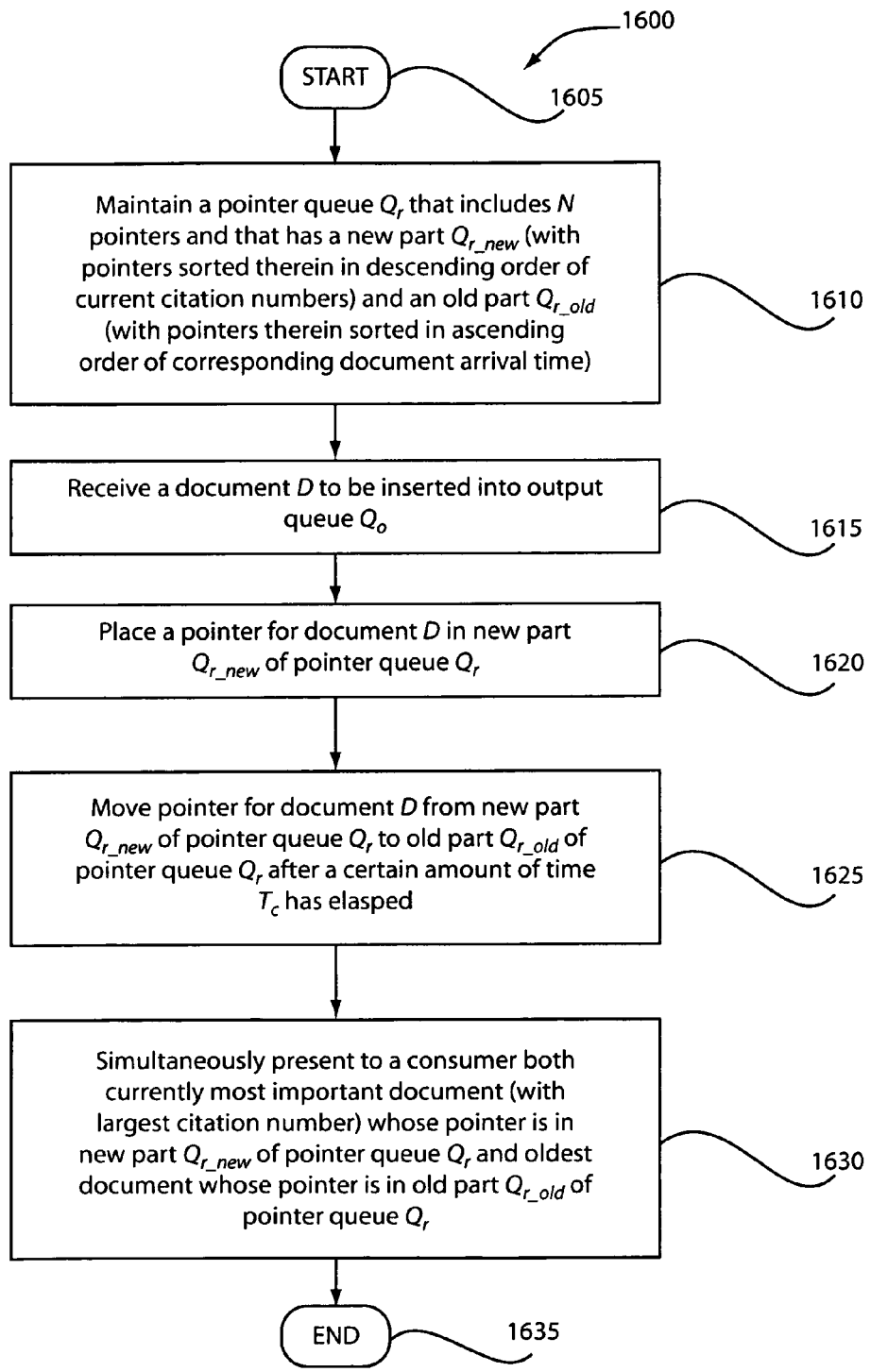
FIG. 16 is a flow diagram for an exemplary method for document ranking, in accordance with an embodiment of the present principles.

Turning to FIG. 16, an exemplary method for document ranking is indicated generally by the reference numeral 1500. The method 1600 includes a start block 1605 that passes control to a function block 1610. The function block 1610 maintains a pointer queue $Q_r$ that includes N pointers and that has a new part $Q_r$ new (with all pointers therein sorted in descending order of the current citation numbers) and an old part $Q_{r\_old}$ (with all pointers therein sorted in ascending order of the arrival time of the corresponding documents), and passes control to a function block 1615.

The function block 1615 receives a document D to be inserted into the output queue $Q_o$ 535, and passes control to a function block 1620. The function block 1620 places a pointer for the document D into the new part $Q_{r\_new}$ of the pointer queue $Q_r$, and passes control to a function block 1625. The function block 1625 moves the pointer for the document D from the new part $Q_{r\_new}$ of the pointer queue $Q_r$ to the old part $Q_{r\_old}$ of the pointer queue $Q_r$ after a certain amount of time $T_c$ (where $T_c$ is a constant) has elapsed, and passes control to a function block 1630. The function block 1630 simultaneously presents to a consumer both the currently most important document (with the largest current citation number) whose pointer is in the new part $Q_{r\_new}$ of the pointer queue $Q_r$ and the oldest document whose pointer is in the old part $Q_{r\_old}$ of the pointer queue $Q_r$, and passes control to an end block 1635.

An embodiment directed to ranking document sources will now be described. For many applications, it is desirable to know the importance of document sources. For example, due to its limited processing power, a system may only want to process documents from those important sources rather than all the available sources. Accordingly, an algorithm for ranking document sources is disclosed. The source ranker 530 uses this algorithm and the information generated by the ONED system 510 to compute the importance of document sources.

Intuitively, a document source is important if it is often the first source to report important events. An important event is mentioned by a large number of documents. Hence, a document source is important if it emits a large number of first-story documents, and many of these first-story documents are frequently cited by the other documents. One observation is that the citations among documents create implicit "links" among document sources. In other words, the citations among documents can be merged together to obtain linking relationships among document sources. Then a PageRank-style algorithm can be used to compute the importance of document sources. For example, a PageRank-style algorithm may be used such as that described by Page et al., in "The PageRank Citation Ranking: Bringing Order to the Web", Technical report, Stanford Digital Library Technologies Project, Jan. 29, 1998, 17 pages, the disclosure of which is incorporated by reference herein. Note that PageRank and other similar algorithms use explicit links among web pages to compute the importance of web pages, whereas our algorithm uses automatically created, implicit links to compute document source importance.

Figure 17:
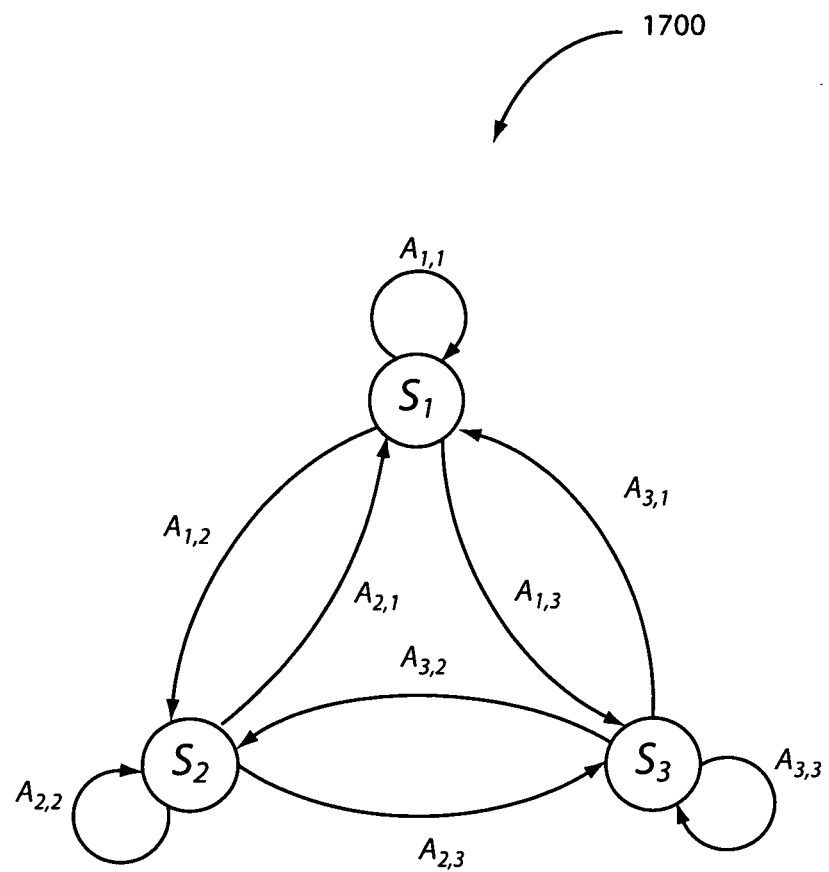
FIG. 17 is a diagram showing an example of three document sources $S_1$, $S_2$, and $S_3$ citing each other, in accordance with an embodiment of the present principles.

Suppose there are n document sources: $S_1, S_2, \ldots,$ and $S_n$. We keep a matrix $A_{n \times n}$. Initially, $\forall i, j$ ($1 \le i \le n$, $1 \le j \le n$): $A_{i,j}=0$. Each time the ONED system 510 discovers that a document from source $S_i$ ($1 \le i \le n$) cites a document from source $S_j$ ($1 \le j \le n$), $A_{i,j}$ is incremented by one. That is, $A_{i,j}$ is the number of times that $S_i$ cites $S_j$, as shown in FIG. 17. Turning to FIG. 17, an example of three document sources $S_1$, $S_2$, and $S_3$ citing each other is indicated generally by the reference numeral 1700. Matrix $B_{n \times n}$ is a normalized version of $A_{n \times n}$ in the sense that each row of B sums to one. That is, $$B_{i,j} = A_{i,j} \bigg/ \sum_{k=1}^{n} A_{i,k}.$$

$B_{i,j}$ represents the fraction of $S_i$'s citations that go to $S_j$.

Let $R_n$ be the importance column vector of all the n document sources. That is, $R_i$ ($1 \le i \le n$) represents the importance of source $S_i$. Intuitively, if a source $S_i$ ($1 \le i \le n$) is important, then the source $S_j$ ($1 \leq j \leq n$) that $S_i$ frequently cites is also important. Also, the importance of a source is influenced by the importance of other sources according to the citation frequencies. If we regard $B_{i,j}$ as the proportion of $S_i$'s importance that contributes to the importance of $S_j$, we have the following:

$$R_i = \sum_{j=1}^{n} R_j \times B_{j,i}.$$

In matrix form, this is as follows:

$$R = B^T \times R.$$

Hence, R is the dominant eigenvector of $B^T$ that corresponds to eigenvalue one.

In general, to ensure that matrix B is ergodic, we can use a method similar to the random surfer model in the above-referenced article entitled "The PageRank Citation Ranking: Bringing Order to the Web", so that $\forall i, j$ ($1 \leq i \leq n$, $1 \leq j \leq n$): $B_{i,j} \neq 0$. Of course, it is to be appreciated that the present principles are not limited to solely using the preceding algorithm for ranking and, thus, other algorithms may also be utilized in accordance with the present principles, while maintaining the scope of the present principles. Then R is guaranteed to be computable using a power method, such as that described in the above-referenced article entitled "The PageRank Citation Ranking: Bringing Order to the Web". The computation of R only needs to be performed periodically, whereas $A_{i,j}$'s need to be updated continuously. This allows us to keep track of the changes in source importance without incurring much computation overhead.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for resource adaptive, real-time new event detection in a new event detection system, comprising:
   capturing, from among documents in a document streaming environment that includes a plurality of remote streaming document sources, first-story documents that mention previously unmentioned events with respect to other documents that have already been at least one of captured and processed by the system; and
   dynamically adjusting a number of first-story documents captured by said capturing step by controlling a number of keywords and documents considered according to a real-time system load.

2. The method of claim 1, wherein said capturing step comprises:
   parsing the documents to determine whether any of the documents are the first-story documents; and
   storing any of the documents determined to be the first-story documents in a memory.

3. The method of claim 2, further comprising:
   classifying the documents as important or non-important based on pre-specified criteria;
   storing, in the memory, only information of the documents classified as important, when the memory overflows;
   discarding the documents that are classified as non-important when a document consumption rate from the memory is less than a document insertion rate into the memory; and
   removing the information of the documents classified as important from the memory subsequent to one of consumption and processing by a consumer.

4. The method of claim 2, further comprising:
   building at least one index that indicates, for each of the first-story documents that are stored in the memory, only a top-K most important terms from among all terms therein, a top-M most important terms, and an arrival time, where M<K;
   discarding, from the memory, information about the first-story documents captured before a last W days based upon the arrival time indicated in the at least one index; and
   pre-filtering, from a newly received one of the documents, older ones of the documents that are unlikely to mention a same event as the newly received one of the documents, based on the top-M most important terms in the older ones of the documents and the newly received one of the documents.

5. The method of claim 4, wherein W, K, and M are dynamically adjusted according to the real-time system load.

6. The method of claim 2, further comprising keeping in the memory only the first-story documents that are predicted to be cited by at least a threshold number of documents in the future, when the memory overflows.

7. The method of claim 2, further comprising dropping from the memory at least some of the first-story documents that are cited by less than a threshold number of documents, when a document consumption rate from the memory is less than a document insertion rate into the memory.

8. The method of claim 2, further comprising reordering the first-story documents in the memory to provide a desired one of the first-story documents to a consumer prior to other ones of the first-story documents.

9. The method of claim 2, further comprising computing an importance of document sources using a citation relationship between the documents provided from the document sources.

10. A computer program product comprising a non-transitory computer usable medium having computer usable program code for resource adaptive, real-time new event detection in a new event detection system, said computer program product comprising:
    computer usable program code for capturing, from among documents in a document streaming environment that includes a plurality of remote streaming document sources, first-story documents that mention previously unmentioned events with respect to other documents that have already been at least one of captured and processed by the system; and
    computer usable program code for dynamically adjusting a number of first-story documents captured by controlling a number of keywords and documents considered according to a real-time system load.

11. The computer program product of claim 10, further comprising:
    computer usable program code for parsing the documents to determine whether any of the documents are the first-story documents; and
    computer usable program code for storing any of the documents determined to be the first-story documents in a memory.

12. The computer program product of claim 11, further comprising:

computer usable program code for classifying the documents as important or non-important based on pre-specified criteria;

computer usable program code for storing, in the memory, only information of the documents classified as important, when the memory overflows;

computer usable program code for discarding the documents that are classified as non-important when a document consumption rate from the memory is less than a document insertion rate into the memory; and computer usable program code for removing the information of the documents classified as important from the memory subsequent to one of consumption and processing by a consumer.

13. The computer program product of claim 11, further comprising:

computer usable program code for building at least one index that indicates, for each of the first-story documents that are stored in the memory, only a top-K most important terms from among all terms therein, a top-M most important terms, and an arrival time, where M<K;

computer usable program code for discarding, from the memory, information about the first-story documents captured before a last W days based upon the arrival time indicated in the at least one index; and computer usable program code for pre-filtering, from a newly received one of the documents, older ones of the documents that are unlikely to mention a same event as the newly received one of the documents, based on the top-M most important terms in the older ones of the documents and the newly received one of the documents.

14. The computer program product of claim 13, wherein W, K, and M are dynamically adjusted according to the real-time system load.

15. The computer program product of claim 11, further comprising computer usable program code for keeping in the memory only the first-story documents that are predicted to be cited by at least a threshold number of documents in the future, when the memory overflows.

16. The computer program product of claim 11, further comprising computer usable program code for dropping from the memory at least some of the first-story documents that are cited by less than a threshold number of documents, when a document consumption rate from the memory is less than a document insertion rate into the memory.

17. The computer program product of claim 11, further comprising computer usable program code for reordering the first-story documents in the memory to provide a desired one of the first-story documents to a consumer prior to other ones of the first-story documents.

18. The computer program product of claim 11, further comprising computer usable program code for computing an importance of document sources using a citation relationship between the documents provided from the document sources.

19. A resource-adaptive, real-time new event detection system, comprising:

a new event detector for capturing, from among documents in a document streaming environment that includes a plurality of remote streaming document sources, first-story documents that mention previously unmentioned events with respect to other documents that have already been at least one of captured and processed by the system; and a non-transitory memory for storing the first-story document, wherein a number of first-story documents captured is dynamically adjusted by controlling a number of keywords and documents considered according to a real-time system load.

20. The system of claim 19, wherein said new event detector classifies documents as important or non-important based on pre-specified criteria, stores in the memory only information of the documents classified as important when the memory overflows, discards the documents that are classified as non-important when a document consumption rate from the memory is less than a document insertion rate into the memory, and removes the information of the documents classified as important from the memory subsequent to one of consumption and processing by a consumer.

* * * * *